United States Patent [19]
Oetiker

[11] 3,946,901
[45] Mar. 30, 1976

[54] APPARATUS FOR CONTROLLING THE LEVEL OF A PARTICULATE POURABLE MATERIAL IN A DEFINED SPACE

[75] Inventor: Hans Oetiker, St. Gall, Switzerland

[73] Assignee: Gebrüder Bühler AG, Uzwil, Switzerland

[22] Filed: Mar. 28, 1974

[21] Appl. No.: 455,904

[30] Foreign Application Priority Data
Apr. 4, 1973  Switzerland.................... 4848/73

[52] U.S. Cl.............................. 222/56; 200/61.21
[51] Int. Cl.²..................... B67D 5/08; H01H 35/00
[58] Field of Search........ 222/1, 56, 64; 214/17 CA; 200/61.20, 61.21

[56] References Cited
UNITED STATES PATENTS

| | | | |
|---|---|---|---|
| 2,111,663 | 3/1938 | Graemiger | 222/56 |
| 2,680,298 | 6/1954 | Obenshain | 222/56 X |
| 3,114,479 | 12/1963 | Keeney | 222/64 |
| 3,210,495 | 10/1965 | Lau | 200/61.21 |

Primary Examiner—Allen N. Knowles
Assistant Examiner—Hadd Lane
Attorney, Agent, or Firm—Michael J. Striker

[57] ABSTRACT

A feeler is moved in a defined space at a predetermined level in alternately opposite directions. If the level of particulate material in the space reaches or exceeds the predetermined level, the movement of the feeler encounters resistance which is sensed, and in dependence of which the level of the particulate material in the space is controlled.

17 Claims, 7 Drawing Figures

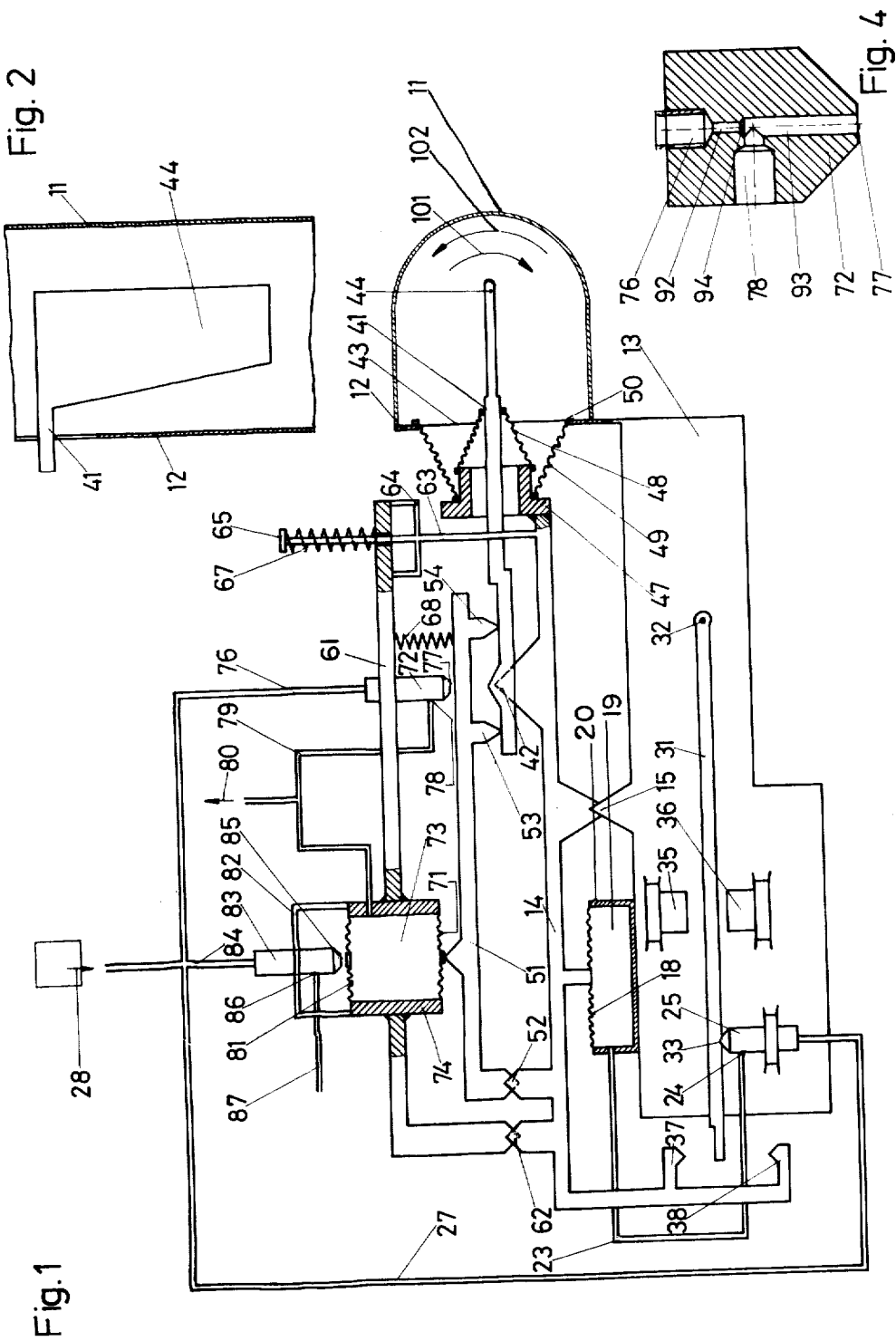

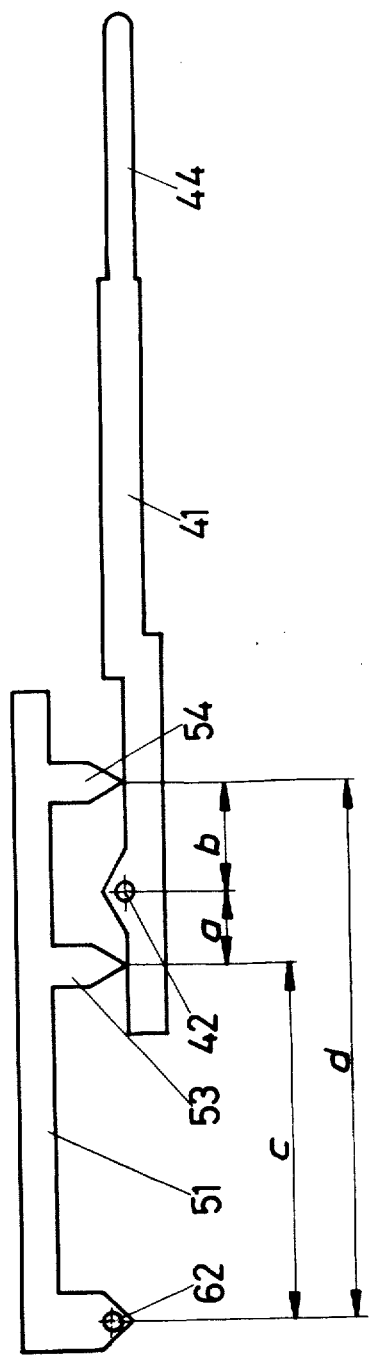

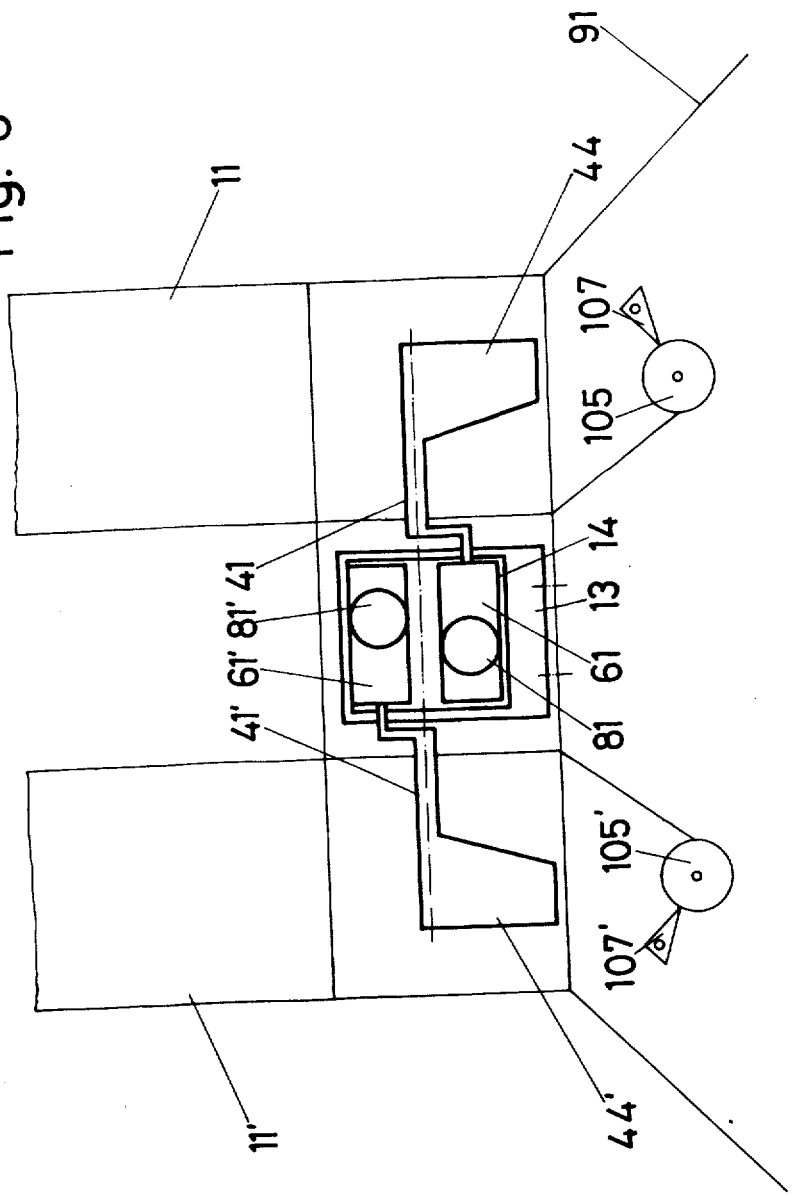

APPARATUS FOR CONTROLLING THE LEVEL OF A PARTICULATE POURABLE MATERIAL IN A DEFINED SPACE

BACKGROUND OF THE INVENTION

The present invention relates to controlling the level of a pourable particulate material in a defined space, and more particularly to a method of effecting such control and an apparatus for carrying out the method.

There are many instances, for instance grinding mills which grind grain or the like, to name only one example, where it is necessary to control the level of a pourable material (e.g. grain).

One prior-art proposal suggests the use of bodies which vibrate at high frequency and which, when they are surrounded to a greater or lesser extent by pourable material, experience a damping of their vibration. This causes a signal to be triggered which indicates that the level of pourable material in the space in which the vibrating body or bodies are located, has reached at least the level of the body or bodies. However, this signal which can be so derived is only a digital signal and cannot be used for an analog regulation of the control of the pourable material. To obtain an analog regulation a large number of such bodies would have to be provided, which would make for a complicated construction aside from the fact that it would not permit continuous measurement but only stepwise measurement.

A further prior-art proposal suggests to use an arm which swings about a horizontal axis and which contacts the pourable material so that, when the level of the pourable material rises, the arm is lifted, analogously to a float-control for sensing the level of liquid. When the lifting movement of the arm is fully completed, an end switch is actuated which produces a signal. However, this signal is again only of a digital nature, which is undesirable. Moreover, this prior-art device will operate only when the pourable particulate material, such as granules, powder or the like, is properly supported from below; if the material is continuously replenished from above and continuously withdrawn from below, there is a movement in downward direction in which case the arm will not be properly supported and the indication will not be accurate. A further prior-art proposal such as the use of a feeler which is mounted on a horizontal shaft and connected with a yieldable drive. The drive is intermittently activated to turn the feeler about the horizontal shaft and, if in so doing the feeler encounters pourable particulate material, the movement of the feeler is blocked and the drive yields. If no material is present, then the feeler will activate a switch which causes the addition of a predetermined quantity of further pourable material into the space. However, the difficulty with this prior-art arrangement is that it can be used only in certain circumstances, and does not permit continuous control of the level.

A further development of this last-mentioned prior-art proposal suggests that when the drive is activated, the displacement of the feeler can be measured so that the extent of such displacement indicates the level at which particulate material is present in the space in question. This, however, is also not suitable for a continuous control and, even if attempts were to be made to further develop this construction to provide a continuous control, the results would necessarily be unsatisfactory because the measurement would not be continuous and would take place only at the end of a stroke of the feeler. This means that the regulation would be substantially influenced by accidental fluctuations in the level of the particulate material because the next measurement would take place only at the end of the next stroke of the feeler.

Other prior-art proposals have also been made, but none of them have been entirely satisfactory. In the case of roller frames used in grinding mills and the like it has been proposed to use very sensitive elements to which the weight of the particulate material is transmitted. However, as soon as any significant amounts of the material should happen to adhere to these sensitive elements, the measuring results will be inaccurate. It has therefore been proposed to provide feelers which are pivoted about a horizontal axis and are loaded by a lateral pressure acting upon them in the region of the base of an essentially conical heap of pured particulate material. The thus-exerted force was found, however, to be insufficient to produce a reliable signal. Optical elements for controlling and supervising the level of the material, on the other hand, were found to be inaccurate because such material tends to develop dust which disadvantageously influences the accuracy of measurement, and devices based upon the use of radiation are complicated and in some instances are not entirely safe.

SUMMARY OF THE INVENTION

Accordingly, it is an object of the present invention to provide an improved control of the level of a pourable particulate material in a defined space.

More particularly, it is an object of the invention to provide a method and an apparatus which affords such improved control.

Another object of the invention is to provide such an improved method and apparatus in which the indications concerning the level of the particulate material are not influenced by the momentary position of the feeler used for detecting the level.

Another object of the invention is to provide such a method and apparatus in which the particulate material is not stirred in a circle, as is the case in some prior-art devices using a rotating feeler.

In keeping with the above objects, and with others which will become apparent hereafter, one feature of the invention resides in a method of controlling the level of a pourable particulate material in a defined space, comprising the steps of effecting a horizontal movement of a feeler in alternately opposite directions in said space at a predetermined level, sensing the resistance to such movement which is encountered by said feeler when the level of particulate material in said space rises above said predetermined level, and controlling the level of particulate material in said space as a function of the sensed resistance.

The control thus is independent of any vertically acting forces and is influenced by a value which can be measured with great sensitivity and precision, namely the resistance which acts upon the moving feeler. By using the absolute value of the sensed resistance it is possible to assure that the sensed resistance provides an almost continuous signal for the regulation of devices which are required to be regulated, and that this control is interrupted only very briefly at the ends of the respective horizontal movement of the feeler, just before the latter reverses its direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a somewhat diagrammatic top-plan view illustrating an embodiment of the invention;

FIG. 2 is a diagrammatic vertical fragmentary side view, showing a detail of FIG. 1;

FIG. 3 is a diagram, illustrating theoretically certain lever-arm ratios of the embodiment in FIG. 1;

FIG. 4 is an axial section through a nozzle used in FIG. 1;

FIG. 6 is a diagrammatic end view of a modification of FIGS. 5 and 5a.

DESCRIPTION OF THE PREFERRED EMBODIMENTS

Figures 5, 5A:
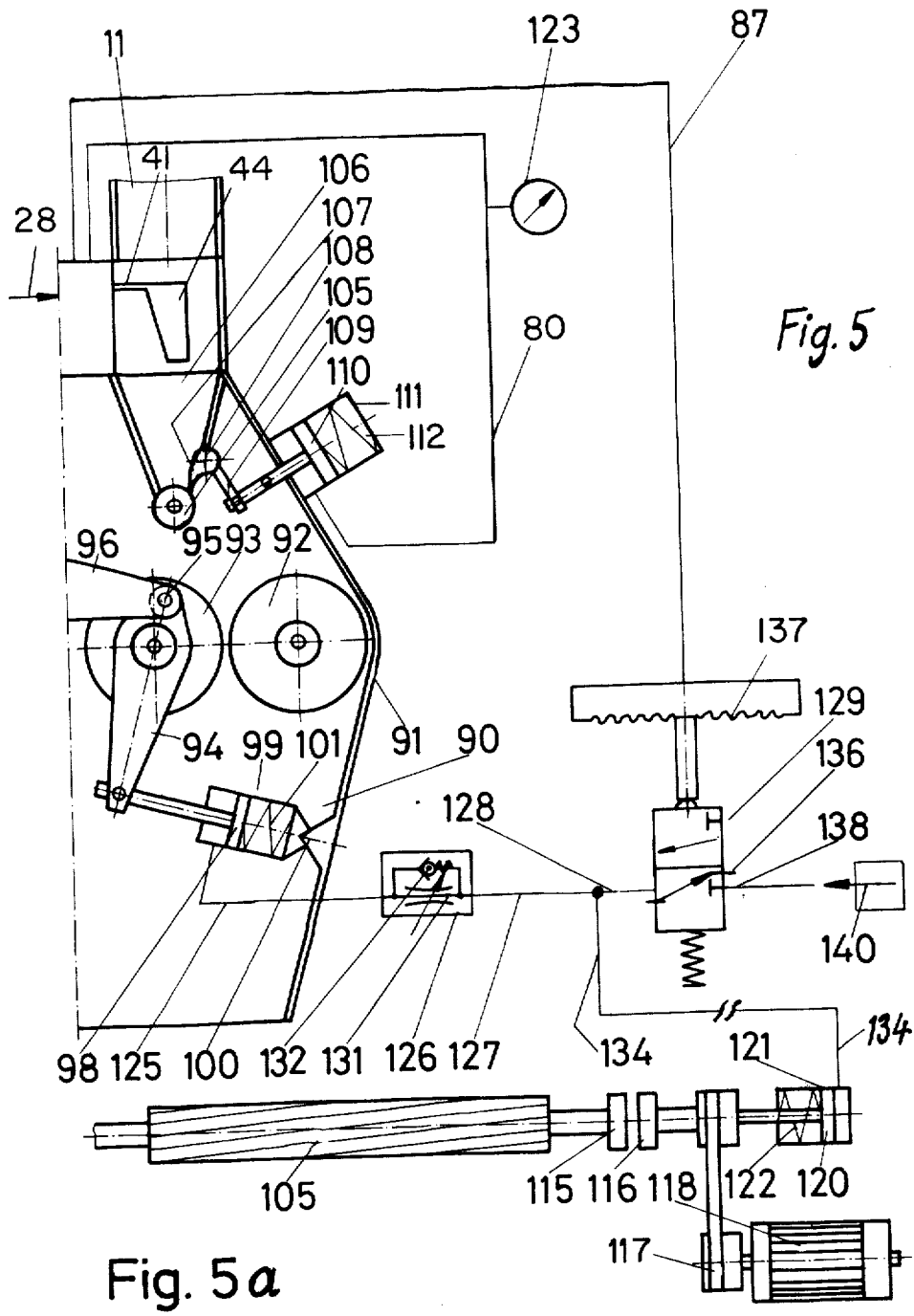
FIG. 5 is a diagrammatic side view, illustrating the use of the embodiment of FIG. 1 in a roller frame of a grinding mill.
FIG. 5a is a diagrammatic fragmentary top-plan view of a detail of FIG. 5.

Discussing now the drawing in detail, and referring firstly to FIGS. 1 and 2, it will be seen that reference numeral 11 identifies a supply pipe through which pourable particulate material, such as granular material, pulverulent material, or the like, passes and wherein the presence of such material and the level to which it is present in the supply pipe 11, is to be measured. The material is admitted at the top of the pipe of FIG. 2 by being poured into the same loosely, and at the bottom of the quantity of the material (the material itself is not shown) in the pipe 11 or in a downwardly arranged receptacle, material is withdrawn in essentially such a quantity that the level of material in the pipe 11 should remain substantially constant, given an appropriate addition of further material.

The pipe 11 may be of glass or a synthetic plastic material, so that its interior can be readily viewed from the outside. It is mounted on a fixed rear wall 12 to which there is also secured a base plate 13 of the device according to the present invention. A frame 14 is mounted on the base plate 13, for pivoting about a vertical axis 15 in clockwise and counterclockwise direction. The frame is driven in such movement by means of a device which is connected with the frame and has a housing 20 formed with an interior pressure space 19 which is spanned over a flexible diaphragm 18. The pressure space 19 is connected via a conduit 23 with the output opening 24 of a nozzle 25 which is also mounted on the base plate 13 and which is connected via a conduit 27 with a source of pressurized fluid 28, for instance a source of compressed air. An arm 31 is mounted on the base plate 13 also, being pivotable about a vertical axis 32; the arm 31 opens or closes the outlet opening 33 of the nozzle 25, depending upon its position. It is movable between two end positions in which it respectively opens and closes the outlet opening 33, and can be held in these end positions by magnets 35 and 36 which are mounted on the base plate 13. It is evident that the arm 31 must be of magnetically permeable material for this purpose. The movement of the arm 31 is effected by contact portions 37, 38 which are spaced from one another and provided on the frame 14.

Also provided on the frame 14 is an arm 41 which is pivotable about a further vertical axis 42 and which extends through an opening 43 in the rear wall 12 into the supply or inlet pipe 11. The arm 41 is pivotable in a horizontal plane and carries at its end located inside the pipe 11 a feeler 44 which is configurated in this embodiment as a vertical flag-shaped member. A sleeve 47 is mounted on the frame 14, surrounding the arm 41 with spacing exteriorly of the pipe 11. The opening 43 is sealed by means of two sealing sleeves, one of them being identified with reference numeral 48 and having opposite axial ends which are connected to the arm 41 and the sleeve 47, respectively, whereas the other sealing sleeve 49 surrounds the sleeve 48 and has opposite axial ends which are connected to the margin 50 of the opening 43 and to the sleeve 47, respectively. The sealing sleeves 48 and 49 are highly flexible.

Another arm 51 is mounted on the frame 14 for pivotal movement about a vertical axis 52 and carries two pressure-transmitting portions 53, 54 which can each press against the arm 41, at opposite sides of the vertical axis 42 of the latter.

Also mounted on the frame 14, for pivoting movement about a vertical axis 62, is an overload on 61. A rod 63 is mounted on the frame 14 and carries an adjustable abutment 64. The rod 63 has a head 65 and is surrounded intermediate the latter and the arm 61 by an expansion spring 67 which bears upon the head 65 and the arm 61 and which presses the latter with a predetermined force against the abutment 64. Intermediate the arm 61 and the arm 51 there is provided a spring 68 which acts upon both of these arms. The arm 61 is provided with a device which in the illustrated embodiment is in the form of a force-transmitting device having a housing 74 formed with an interior pressure space 73; the housing 74 is mounted on the arm 61 and an opening of the housing is spanned by a flexible diaphragm 71. A nozzle 72 is connected via a conduit 76 to the source 28 and has an outlet opening 77 which can be opened and closed depending upon whether it is engaged and blocked or disengaged and opened by the arm 51. The nozzle 72 has an output opening 78 which communicates via a conduit 79 with the pressure space 73. A conduit 80 communicates with the conduit 79 and serves to connect with the latter a device whose operation is to be subjected to analog control.

The housing 74 has a further opening which is spanned by a second diaphragm 81, and a further nozzle 83 is mounted on the housing 74 by means of a bracket 82 or the like. The nozzle 83 is also connected with the source 28, by means of a conduit 84. It has an outlet opening 85 which is opened and closed by engagement or disengagement with it of the diaphragm 81. An output opening 86 of the nozzle 83 is connected to a conduit 87 which in turn can be connected with a device or devices which are to be subjected to digital control.

All of the nozzles 25, 72 and 83 are constructed in the manner shown in FIG. 4, where this has been illustrated specifically for the nozzle 72. Here, the central passage of the nozzle 72 has a throttle-portion 92 which communicates with the conduit 76. It has a further portion 93 extending from the throttle portion 92 to the outlet opening 77. The cross-sectional area of the portion 93 is substantially larger than that of the portion 92, and in fact a multiple thereof. The difference between the smaller cross-sectional area of the portion 92 and the larger cross-sectional area of the portion 93, and the fact that the transition is quite abrupt at the juncture of the two portions, and that the output 78 communicates with the portion 93 but immediate adjacent the juncture thereof with the portion 92, the juncture being identified with reference numeral 94, assures that a suction effect takes place in the region immediately downstream the transition 94 and thus in the output 78, which is required for purposes will be described subsequently.

The operation of the device in FIGS. 1-4 is as follows:

When the arm 31 is in the position shown in FIG. 1 it closes the opening 33 of the nozzle 25. The arm is held in this position by the magnet 36, and pressurized fluid flows from the source 28 via the conduit 27, the nozzle 25, the output 24 and the conduit 23 into the space 19. This means that the pressure in the space 19 rises and deflects the diaphragm 18 which causes the frame 14 to be pivoted in clockwise direction, so that the feeler 44 moves in the direction of the arrow 101. If the feeler 44 does not encounter any particulate material, because the level of the material does not extend to or upwardly beyond the level of the lower end of the feeler 44, then the feeler 44 will encounter no resistance to its movement. The spring 68 holds the arm 51 spaced from the opening 77 and pressurized fluid flows from the source 28 via the conduit 76 through the portion 92 and the portion 93 and out the opening 77. A jet-pump effect is obtained in the region of transition 94, so that reduced pressure develops in the opening 78 and via the same in the space 73, so that fluid flows from the space 73 via the conduit 79 to the output 78 and from there is ejected via the outlet 77. This continues until the pressure in the space 73 corresponds to the pressure in the output opening 78. The diaphragm 71 thus does not act upon the arm 51, and the reduced pressure in the space 73 produces a restoring force upon the diaphragm 71, tending to withdraw it inwardly.

The pressure in space 19 continues to rise during this time, and the diaphragm 18 continues to displace the frame 14 in clockwise direction until the engaging portion 38 contacts the associated end of the arm 31, overcomes the force exerted by the magnet 36 and displaces the arm 31 towards the magnet 35 which now holds the arm in its new end position. At this time pressurized fluid can now flow from the conduit 27 via the nozzle 25 through the outlet opening 33 thereof which is now open. Reduced pressure now prevails at the output opening 24, so that fluid is withdrawn from the space 19 via the conduit 23. The diaphragm 18 now draws the frame 14 in the opposite direction, since it is connected with the frame 14 and is being drawn inwardly into the space 19. This means that the arm 41 with the feeler 44 now moves in the direction of the arrow 102, that is in counterclockwise direction. At the end of this movement the engaging portion 37 contacts the free end of the arm 31, overcomes the force of the magnet 35 and moves the arm 31 towards the magnet 36 and against the opening 23 of the nozzle 25, which opening it closes. Pressure fluid again flows from the conduit 27 via the nozzle 25, the output opening 24 and the conduit 23 into the space 19, where the pressure begins to rise again so that the diaphragm 18 is flexed outwardly and displaces the frame 14 again in clockwise direction, causing the feeler 44 to move in the direction of the arrow 101. This cyclical displacement in alternately opposite directions is constantly repeated.

It is assumed that particulate material is being poured into the pipe 11 and begins to back up in the same. When the level of the material in the pipe 11 reaches the level of the lower end of the feeler 44, or rises above it, then this exerts a retarding effect, that is a resistance, upon the movement of the feeler 44 and the arm 41. Assuming, for the sake of explanation, that this takes place during the movement of the feeler 44 in the direction of the arrow 101, then the arm 41 will act upon the arm 51 via the portion 54. After overcoming the force of the spring 68 the arm 51 closes the opening 77 of the nozzle 72, and pressure fluid now flows from the source 28 via the conduit 76, the nozzle 72, the output opening 78 thereof and the conduit 79 into the pressure space 73. The pressure in the space 73 rises and the diaphragm 71 is deflected and presses against the arm 51 until the latter moves away from the opening 77, permitting pressure fluid to flow through the same again from the conduit 76 via the nozzle 72 and the opening 77. Reduced pressure prevails at the output opening 78, so that fluid is drawn via the conduit 79 out of the space 73. Assuming that the level of mateial in the pipe 11 remains constant, and as soon as the pressure in the space 73 has slightly dropped, the force transmitted by the arm 41 upon the portion 54 overcomes the forces exerted upon the arm 51 by the spring 68 and the diaphragm 71, so that the arm 51 again closes the opening 77. Now, the pressure rises again in the space 73 until the opening 77 is freed again. This process is repeated in rapid succession so that the pressure in the space 73 fluctuates slightly about a constant value corresponding or representative of the level of the material in the pipe 11.

If, now, the level of the material in the pipe 11 rises, then the resistance of it by the material to the movement of the feeler 44 increase also, and the force exerted by the arm 41 upon the portion 54 increases correspondingly. In order to again reach equilibrium the force exerted by the diaphragm 71 upon the arm 51 must be higher, so that the pressure in the space 73 will increase. This pressure in the space 73 is supplied to the conduit 80 as an analog regulating value or signal. The force exerted by the spring 68 is substantially smaller than that which is exerted by the diaphragm 71; this force of the spring 68 assures that in the condition in which the feeler 44 does not encounter resistance, the arm 51 will be maintained at a distance from the opening 77, so that at start-up a reduced pressure prevails at the output opening 78.

When the frame 14 moves in the opposite direction, arm 41 and feeler 44 travel in the direction of the arrow 102. If material is present in the pipe 11 which can offer resistance to this movement of the feeler 44, the resistance which acts upon the feeler 44 is transmitted to the arm 41 and via the same upon the portion 53, and thus to the arm 51, so that the transmission now takes place via the portion 53 and no longer via the portion 54 as before. This means that in both directions of movement the resistance force acting upon the feeler 44 is applied in one and the same direction to the arm 51. To assure that this force will produce a uniform effect upon the arm 51, the ratio of the cooperating lever arms of the arm 41 and of the arm 51 must be equal, which is assured if, as shown in FIG. 3, the relationship $a/c = b/d$. This means that the conversion of the resistance force acting upon the feeler 44 into the pressure in the chamber 73 which is used as an analog signal, is the same in both directions of movement of the feeler 44. it is only briefly interrupted when the frame 14 reverses its direction of movement, so that the pressure in the space 73 and thus in the conduit 80 fluctuates only slightly from its respective absolute value.

Until the particulate material in the pipe 11 reaches a certain level, the pressure in the space 73 will remain so low that the diaphragm 81 will leave the opening 85 of the nozzle 83 in unblocked condition, so that compressed fluid flows from the source 28 via the conduit 84, the nozzle 83 and the opening 85. This means that reduced pressure prevails at the output 86 and is transmitted via the conduit 87 to whatever devices which are connected with the same and are to be digitally controlled. On the other hand, when the level of material in the pipe 11 reaches a greater predeterminable level, then the resistance upon the feeler 44 to the movement thereof becomes so high that the pressure in the space 83 rises sufficiently for the diaphragm 81 to be deflected and to close the opening 85. Now, pressurized fluid flows from the conduit 84 via the nozzle 83, the output 86 and the conduit 87 to the digitally controlled devices which are activated and which remain in their new operative position as long as the level of the material in the pipe 11 does not drop below the aforementioned predetermined level.

If the rise in the level of material in the pipe 11 were very substantial, the pressure in the space 73 would correspondingly increase very substantially, which would mean that the parts involved would have to be made particularly small, especially the diaphragm 71. In order to avoid this it would be necessary to use a source 28 furnishing much reduced pressure. However, these problems are avoided according to the construction according to the present invention, by utilizing the spring 67 which acts as an overload relief. If the maximum permissible pressure in the space 73 is exceeded, the reaction of the arm 51 upon the arm 61 overcomes the biasing force of the spring 67 acting upon the arm 61, so that the spring 67 becomes compressed. Due to this compression, the nozzle 72 moves away from the arm 51 and the opening 77 of the nozzle is unblocked. This, in turn, means that reduced pressure exists again at the output 78 and the pressure in the space 73 decreases. As long as the level of material in the pipe 11 is above the maximum permissible level, the pressure in the space 73 will fluctuate about a high but still permissible value. Advantageously the force excerted by the spring 67 will be so selected that the frame 14 can be driven to-and-fro, that is in clockwise and counterclockwise direction, without being blocked in its movement even if for some reason the feeler 44 itself should be blocked against movement by the material in the pipe 11.

The forces transmitted by the sleeve 48 from the frame 14 upon the arm 41 are negligible, and in normal operation the relative movement of the arm 41 with reference to the frame 14 is in any case very small. The movement of the frame 14 with reference to the pipe 11, on the other hand is substantially larger under normal operating conditions and results in a correspondingly high deformation of the sealing sleeve 49 which, however, is completely segregated from the arm 41 and not transmitted to it.

The device described with reference to FIGS. 1–4 is particularly suitable for use in controlling a roller frame of a grinding mill, as has been illustrated in FIGS. 5 and 5a. Such a grinding mill may, for instance, be a mill which grinds grain or the like. The roller frame is identified in FIGS. 5 and 5a with reference numeral 90 and has a housing 91 in which there is journalled the fixed roller 92, that is the roller which rotates about a fixed axis. A further roller 93 is journalled on arms 94 (only one shown) for rotation about a horizontal axis 95 which is carried by a support 96 mounted on the housing 91. A piston 98 is accommodated in a cylinder 99 and acts upon the arm or arms 94; the cylinder 99 is mounted on the housing 91 for pivotal movement about a horizontal axis 100. A spring 101 in the cylinder 99 acts upon the piston 98 and tends normally to displace the roller 93 away from the roller 92.

A feed hopper 106 communicates at its upper end with the inlet pipe 11 corresponding to the one in FIGS. 1–4. The outlet end of the feed hopper 106 has arranged downwardly adjacent to it a feed roller 105 with which a doctor blade 107 cooperates which is mounted for pivotal movement about a horizontal pivot axis 108 on the housing 91. An arm 109 is connected with the doctor blade 107 and a piston 110 in a cylinder 111 mounted on the housing 91, acts upon the arm 109. A spring 112 acts upon the piston 110 and normally tends to displace the same in such a manner that the doctor blade 107 is in engagement with the periphery of the roller 105 and does not define a feed gap with the same.

The roller 105 is also shown in FIG. 5a and will be seen to have connected with it one portion 115 of a drive coupling, the other portion 116 of which is constantly driven from a motor 118 via a belt drive 117 or the like. A piston 120 in a cylinder 121 acts upon the coupling portion 116, and a spring 122 in the cylinder 121 acts upon the piston 120 in a sense causing the piston 120 to be retracted, that is to maintain the coupling portion 116 out of driving engagement with the coupling portion 115.

The cylinder 111 communicates with the conduit 80 in the latter of which as is shown in FIG. 5 here can be interposed a pressure measuring gauge 123. The cylinder 99 is connected via a conduit 125, a time delay unit 126 and conduit portions 127, 128 to a control valve 129. The time delay unit 126 comprises a throttle 131, which can be adjustable as shown, and which is connected in parallel with a one-way valve 132 that blocks the flow of fluid from the valve 129 to the cylinder 99 but permits it in the opposite direction. A conduit 134 and the conduit portion 128 connect the cylinder 121 also with the valve 129. The latter has a three-way valve which in its rest position connects the conduit portion 128 with an outlet opening 136. The valve 129 is controlled by a diaphragm 137 which receives fluid from the conduit 87. When the diaphragm 137 operates the valve 129, the latter communicates the conduit portion 128 with a supply conduit 138 which receives compressed fluid from a further source 140, whose pressure is greater than that of the source 28.

The embodiment in FIGS. 5 and 5a is shown in a position in which the rollers 92 and 93 are spaced from one another but are driven. The motor 118 rotates but the feeding device 105, 107 is not in operation and there is no gap between the members 105 and 107 through which material could enter to be ground between the rollers 92 and 93. The feeler 44 is in operation in the manner described with reference to FIGS.

1-4. The spring 101 maintains the roller 93 away from the roller 92, and the spring 112 presses the doctor blade 107 against the periphery of the roller 105. The spring 121 maintains the coupling portion 116 out of engagement with the coupling portion 115 and the roller 105 is stationary.

When the material to be ground is supplied through the pipe 11, it backs up in the feed hopper 106 and when it reaches the level of the lower end of the feeler 44, the movement of the latter encounters resistance, so that a control pressure develops in the conduit 80 in the manner described with reference to FIGS. 1–4. This control pressure, here pressurized air, acts as an analog signal which displaces the piston 110 against the force of the spring 111, so that the doctor blade 107 moves away from the roller 105 to form with the same a gap the width of which is a function of the level of the material in the pipe 11. If the roller 105 is still not in rotation, no material enters into the gaps between the rollers 92 and 93. If the level of material in the pipe 11 continues to rise with reference to the feeler 44, then a pressure develops in the conduit 87 in the manner described with respect to FIGS. 1–4, and the diaphragm 137 switches the control valve 129 from the outlet opening 136 to the supply conduit 138. Pressure from the source 140 now travels via the conduit 138, the valve 129, the conduit portion 128 and the conduit 134 into the cylinder 121, where it displaces the piston 120 against the force of the spring 122, causing the coupling portion 116 to come into driving engagement with the coupling portion 115. This results in driving of the roller 105 in rotation, and the material in the hopper 106 now passes through the gap between the roller 105 and the doctor blade 107 into the gap between the rollers 92 and 93.

It will be appreciated that the higher the level of material in the pipe 11, the more will be the resistance experienced by the feeler 44 in its movement, and the higher the pressure in the conduit 80 and in the gauge 123. This means that the doctor blade 107 will be moved to form with the roller 105 a gap of lesser or greater width, so that the material which is withdrawn through this gap from the hopper 107 corresponds to the material that is being admitted into the pipe 11 and causes the level of material therein to rise or to drop (if less material is admitted than is being withdrawn). It is clear, of course, that the pressure in the conduit 80 could also be used for controlling the operation of the motor 118 or a variator or the like used in place of the belt drive 117.

When the valve 129 is switched to operative position, pressurized fluid flows also via the conduit portions 128, 127, the throttle 131 and the conduit 125 into the cylinder 99. The path via the one-way valve 132 is blocked, however, which means that the pressurized fluid acts (because of the throttle 131) upon the piston 98 with a delay relative to its action causing the rotation of the roller 105. Thus, the roller 93 is moved to its operative position in which it cooperates with the roller 92, with a delay relative to the start-up of rotation of the roller 105, thereby assuring that the rollers 92 and 93 can contact one another only when material to be ground is already being supplied to them. If they were to engage in the absence of such material, this would lead to a rapid destruction of the rollers 92, 93.

When no further material is being admitted into the pipe 11, pressure in the conduit 87 drops and this results in the development of under pressure in the manner described with respect to FIGS. 1–4. This terminates the effect of the diaphragm 137 upon the valve 129, so that the latter again automatically returns to its previous position. This in turn interrupts the supply of pressurized fluid from the source 140 via the conduit 138, and the conduit portion 128 is placed into communication with the outlet 136 again. The spring 101 moves the piston 98 towards the left and the roller 93 is moved away from the roller 92. This movement is substantially instantaneous, because the air can freely flow from the cylinder 99 via the conduit 125, the one-way valve 132, the conduit portions 127, 128 and the valve 129 through the outlet 136. At the same time, pressurized fluid is vented from the cylinder 121 via the conduit 134, conduit portion 128, valve 129 and outlet 136, so that the spring 122 shifts the pistion 120 towards the right and disengages the coupling portion 116 from the coupling portion 115, so that driving of the roller 105 is terminated.

In FIGS. 5 and 5a I have illustrated one-half of a roller frame as used in a grinding mill. As is known, however, clutch roller frames have two halves which operate independently of one another. FIG. 6 shows that each of these halves can be provided with a control arrangement such as used in FIGS. 5 and 5a, which arrangements operate independently of one another, but are combined in a single device. The components and parts associated with one half of the roller frame and the common components have the previous reference numerals, and the components associated with the other half of the roller frame are provided with prime symbols in FIG. 6. The meaning of the reference numerals is the same as before, and each reference numeral having a prime symbol identifies a component which is identical with the same component having the same reference numeral but without the prime symbol.

With this in mind, it will be seen that a common base plate 13 is provided on the housing 91 intermediate the two supply pipes 11, 11' and carries the frame 14 in the manner as described earlier. The frame 14 is provided with two otherwise independent control devices of the type described in FIGS. 1–4, which are diagrammatically identified by the showing of the components 41, 44, 61 and 81, and the components 41', 44', 61' and 81'. In the event that for instance the feeler 44 should be blocked from further movement, because of the excessive supply of material through and into its pipe 11, then the force of the spring 67 is overcome in the manner described earlier, and the frame 14 continues to move so that the function of the other control device having the component 41', 44', 61' and 81' is not in any way influenced by this blockage, and of course the same is true if the situation were reversed.

It will be appreciated that the configuration of the feeler 44 could be different from the one illustrated, and that the orientation need not be strictly vertical.

It will also be appreciated that the device in FIGS. 1–4 can be used to control devices other than the roller frame shown in FIGS. 5, 5a and in FIG. 6. With respect to the control of the roller frame, however, the use of the device in FIGS. 1–4 is particularly advantageous because one and the same source of pressurized fluid, for instance compressed air, can be used for controlling all operations, thus eliminating the need for converting other forms of energy into pneumatic energy which is usually complicated and expensive. It is also possible to provide other components than those which have been discussed with respect to FIGS. 1–4 for converting the resistance to movement of the feeler 44 into a signal which is used to control the various other devices. Such modifications will offer themselves readily to those skilled in the art.

It will be understood that each of the elements described above, or two or more together, may also find a useful application in other types of constructions differing from the types described above.

It is not shown in FIG. 5, but it is also possible, to use the pressure in the conduit 80 to control the speed of the motor 118 or, by using variable drive coupling instead of the belt drive 117, to control the speed of the variable drive itself. This enables to control the speed of the feed roller 105 and therefore to control the level of particulate material in the space in an analog manner by using the control signal sensed by the feeler member.

In many cases it is reasonable to use the digital signal from the conduit 87 to open and shut the cooling water system or to engage and disengage the seraper and generally to give a control signal over a distance.

Further it is fully within the meaning of the present invention to use the digital signal to sense the level in silo, etc. to stop the feed conveyor, to shut a feed opening, etc.

While the invention has been illustrated and described as embodied in controlling the level of a pourable particulate material in a defined space, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art farily constitute essential characteristics of the generic or specific aspects of this invention and, therefore, such adaptions should and are intended to be comprehended within the meaning and range of equivalence of the following claims.

What is claimed as new and desired to be protected by Letters Patent is set forth in the appended claims:

1. An apparatus for controlling the level of a pourable particulate material in a defined space, comprising an arm mounted for displacement in a horizontal plane; a feeler member carried by said arm and being located in said space; a drive for displacing said arm in alternately opposite directions, whereby said feeler member encounters resistance when the particulate material in said space exceeds a predetermined level; a frame pivotable about a fixed vertical first axis, said arm being mounted on said frame for pivotable movement about a second vertical axis; first means operatively associated with said arm for sensing resistance encountered by said feeler member and converting the sensed resistance into a control signal, said first means being mounted on said frame and being engaged by said arm for converting said resistance which is transmitted in form of a torque transmitted from said arm to said first means; and second means for furnishing said control signal to a device which is to be controlled thereby.

2. An apparatus as defined in claim 1, wherein said feeler member is a substantially flat-shaped member having a substantially vertical orientation.

3. An apparatus as defined in claim 1; further comprising an additional arm also mounted in said frame and being pivotable about a third vertical axis spaced from said second vertical axis, and a pair of force-transmitting portions at opposite sides of said second axis and each adapted to transmit force between said arms in dependence upon the direction of pivoting of said frame.

4. An apparatus as defined in claim 3, wherein said arm has two first lever arms and said additional arm has two second lever arms each of which cooperates and forms a pair with one of said first lever arms; and wherein the transmission ratio of the lever arms in each pair is identical.

5. An apparatus as defined in claim 4, wherein said drive comprises a force-exerting pivoting device operatively associated with said frame for effecting pivoting of the same.

6. An apparatus as defined in claim 5, wherein said force-exerting pivoting device comprises a housing having an interior pressure compartment formed with an opening, a flexible diaphragm spanning said opening, a nozzle having an outlet opening and being connected with a source of pressure fluid, a conduit connecting said compartment with said nozzle upstream of said outlet opening, and a control member pivotable about an upright axis and movable between two end positions in which it respectively opens and blocks said outlet opening.

7. An apparatus as defined in claim 6; and further comprising first and second magnets operative for retaining said control member with a predetermined force in the respective end positions thereof.

8. An apparatus as defined in claim 6, wherein said nozzle has a passage having a first portion formed with said outlet opening, and a second portion upstream of said first portion and of substantially smaller cross-sectional area than the same, said portions forming a juncture and said conduit communicating with said first portion in the region of said juncture.

9. An apparatus as defined in claim 3, wherein said first means comprises a nozzle connected with a source of compressed fluid and having an outlet opening which is opened or closed in dependence upon the pivoting of said additional arm, and a force-exerting restoring device controlled by said nozzle and acting upon said additional arm in a direction counter to forces transmitted thereto by the first-mentioned arm.

10. An apparatus as defined in claim 9, wherein said nozzle has an output opening, and said restoring device comprises a flexible diaphragm communicating with said output opening to be flexed in dependence upon the fluid-pressure prevailing at said output opening.

11. An apparatus as defined in claim 10; and further comprising connecting means for connecting said output opening with a device which is to be controlled analogously to the fluid-pressure at said output opening.

12. An apparatus as defined in claim 11; and further comprising another force-exerting restoring device also connected with said output opening of said nozzle; and an additional nozzle connected with said source of compressed fluid and controlled by said additional restoring device, said additional nozzle having an additional output opening; and further comprising additional connecting means for connecting said additional output opening to a device which is to be digitally controlled.

13. An apparatus as defined in claim 12, wherein said devices have a common housing and a common pressure compartment, and a pair of separate diaphragms each spanning a different opening of said pressure compartment.

14. An apparatus as defined in claim 9; further comprising an overload arm mounted for pivoting about a fourth vertical axis, said first means being mounted on said overload arm; and biasing means biasing said overload arm towards said frame with a predetermined biasing force.

15. An apparatus as defined in claim 14; further comprising another arm and another first means associated with said frame and operative independently of the first-mentioned arm and first means.

16. An apparatus as defined in claim 10, wherein said nozzle has a passage having a first portion formed with said outlet opening, a second portion upstream of said first portion and of substantially smaller cross-sectional area than the same, said portions forming a juncture and said output opening communicating with said first portion in the region of said juncture; and further comprising a biasing spring acting upon said additional arm and permanently tending to pivot the same to a position in which said outlet opening is opened.

17. An apparatus as defined in claim 1; further comprising wall means surrounding said space and having an opening through which said arm extends into said space; a mounting sleeve spacedly surrounding said arm outside said opening and being mounted on said frame; a first flexible sealing sleeve having opposite first ends connected to said arm and said mounting sleeve, respectively; and a second flexible sealing sleeve having opposite second ends connected to said sleeve and to a circumferential margin of said opening, respectively.

* * * * *